United States Patent
Kanbara et al.

(10) Patent No.: US 6,955,102 B2
(45) Date of Patent: Oct. 18, 2005

(54) TRANSMISSION FOR WORKING MACHINES

(75) Inventors: Fumiyoshi Kanbara, Wako (JP); Yoshitaka Ohta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 117 days.

(21) Appl. No.: 10/733,418

(22) Filed: Dec. 11, 2003

(65) Prior Publication Data

US 2004/0139813 A1 Jul. 22, 2004

(30) Foreign Application Priority Data

Jan. 21, 2003 (JP) ........................................ 2003-012899

(51) Int. Cl.$^7$ .......................... F16H 59/02; B60K 20/00
(52) U.S. Cl. ..................... 74/335; 74/473.19; 74/473.33
(58) Field of Search .............................. 74/335, 473.18, 74/473.19, 473.3, 473.33

(56) References Cited

U.S. PATENT DOCUMENTS

| | | | | | |
|---|---|---|---|---|---|
| 3,902,378 | A | * | 9/1975 | Osborn ..................... | 74/473.19 |
| 4,085,833 | A | * | 4/1978 | Papasideris ................ | 477/92 |
| 4,216,680 | A | * | 8/1980 | Hayashi et al. .......... | 74/473.33 |
| 4,616,724 | A | * | 10/1986 | Lemke ...................... | 180/6.48 |
| 5,156,060 | A | * | 10/1992 | Shirahama et al. ...... | 74/473.12 |
| 5,249,477 | A | * | 10/1993 | Wardenier ................ | 74/473.33 |
| 6,247,378 | B1 | * | 6/2001 | Newendorp et al. ..... | 74/473.12 |

FOREIGN PATENT DOCUMENTS

| | | | | |
|---|---|---|---|---|
| JP | 1032113 | | 2/1989 | |
| JP | 05-26331 | * | 2/1993 | ............... 74/473.26 |
| JP | 05-79548 | * | 3/1993 | ............... 74/473.24 |

* cited by examiner

Primary Examiner—Ha Ho
(74) Attorney, Agent, or Firm—Adams & Wilks

(57) ABSTRACT

A transmission for working machines having a drive transmission mechanism and a working transmission mechanism which are operated by swinging a shift lever is provided. The transmission has a drive shift member for connecting the shift lever to the drive transmission mechanism and a working shift member for connecting the shift lever to the working transmission mechanism. The shift lever has a first protrusion constantly engaging the drive shift member and a second protrusion arranged to engage with or disengage from the working shift member. When the first protrusion engages the drive shift member with the second protrusion not engaged with the working shift member, only the drive transmission mechanism operates. When the first protrusion engages the drive shift member with the second protrusion also engaging the working shift member, both the drive transmission mechanism and the working transmission mechanism operate.

1 Claim, 18 Drawing Sheets

(EMBODIMENT)

(COMP.EXAMPLE)

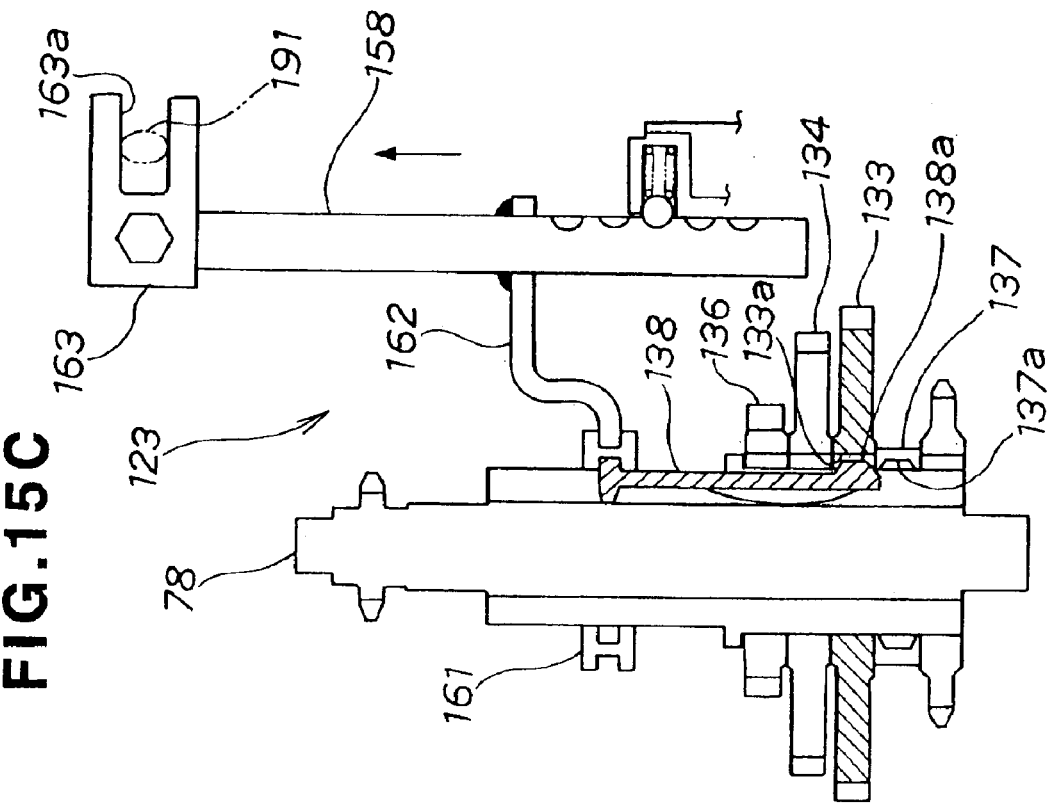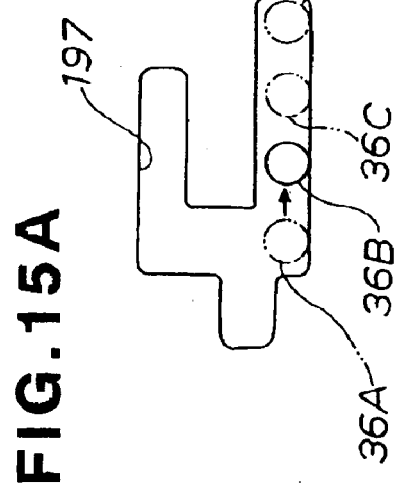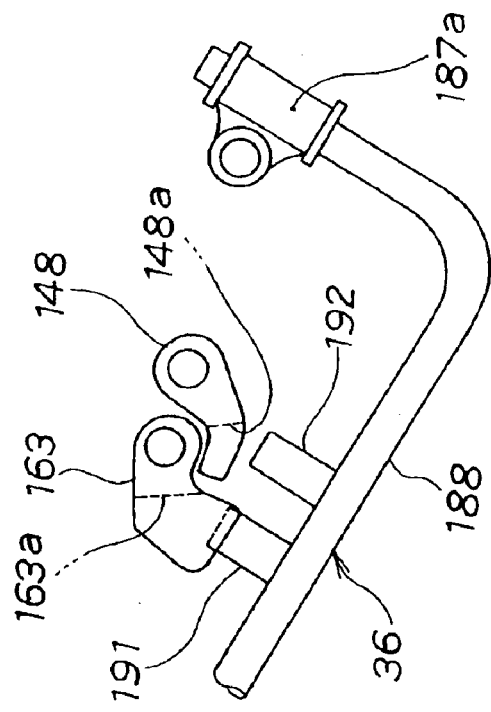

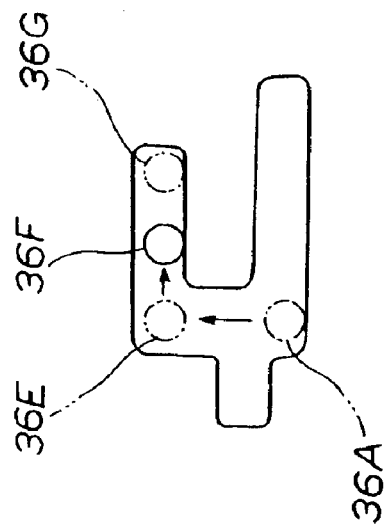
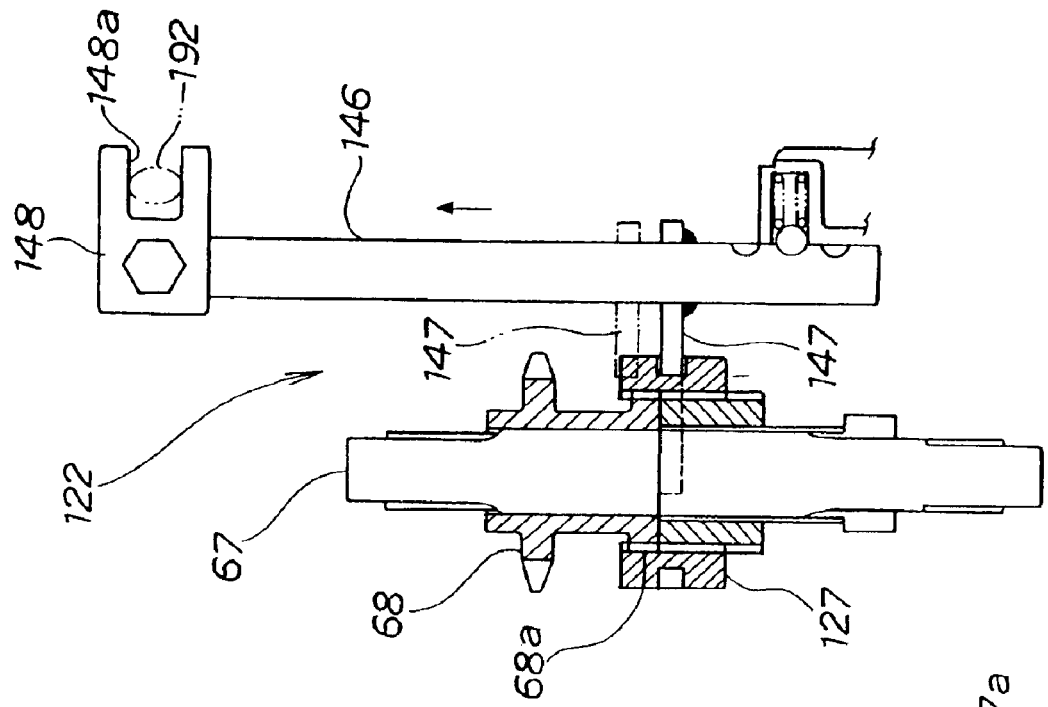
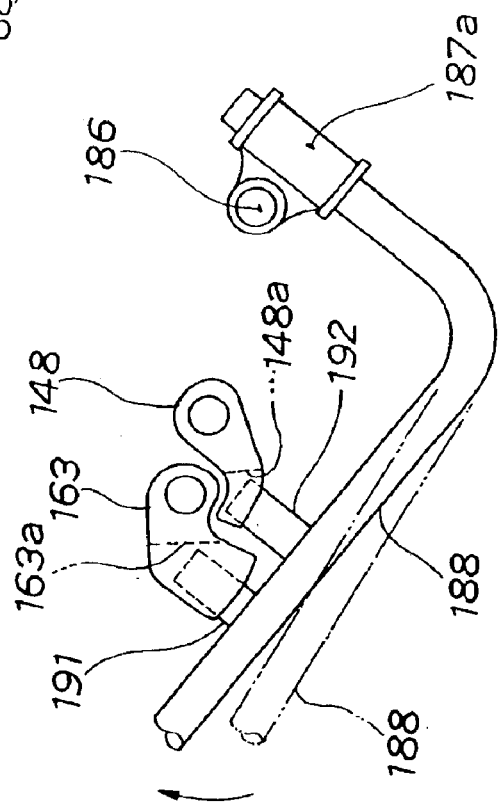
FIG. 17A
FIG. 17B
FIG. 17C

TRANSMISSION FOR WORKING MACHINES

FIELD OF THE INVENTION

The present invention relates to transmissions for working machines, and more particularly, to a transmission having a working transmission mechanism and a drive transmission mechanism.

BACKGROUND OF THE INVENTION

A transmission for working machines having a working transmission mechanism and a drive transmission mechanism is disclosed, for example, in Japanese Utility Model Laid-Open Publication No. HEI-1-32113. This transmission will be described with reference to FIGS. 18 and 19 hereof.

Referring to FIGS. 18 and 19, a shaft 202 is rotatably mounted to a transmission case 201. An outside pipe 203 to be a support is attached to the shaft 202. An inside pipe 204 is rotatably fitted in the outside pipe 203. A change lever 205 is connected to the inside pipe 204. An arm 209 is mounted on the inside pipe 204. The arm 209 has an elongated hole 210. A pin 211 passes through the elongated hole 210. An end of the pin 211 is fitted in a change shaft 212. The change shaft 212 is connected to a drive transmission mechanism.

An arm 215 is mounted on a distal end portion of the shaft 202. A distal end portion of a pin 217 mounted to a change shaft 219 via a boss 218 is fitted into an elongated hole 216 formed in the arm 215. The change shaft 219 is connected to a working transmission mechanism.

As shown in FIG. 18, a swing of the change lever 205 in the vertical direction in the figure causes a vertical swing of the arm 215. With this, as shown in FIG. 19, the change shaft 219 rotates via the pin 217 and the boss 218 for a gear change of the working transmission mechanism.

As shown in FIG. 19, a swing of the change lever 205 in the vertical direction in the figure causes the arm 209 to swing, with which the change shaft 212 axially moves via the pin 211 for a gear change of the drive transmission mechanism.

A gear change of the drive transmission mechanism is made by a horizontal operation of the change lever 205. A gear change of the working transmission mechanism is made by a vertical operation of the change lever 205. The vertical and horizontal shift controls are complicated and awkward for a transmission with a drive transmission mechanism and a working transmission mechanism both for multi-speed change. There are a large number of components between the change lever 205 and the drive transmission mechanism and working transmission mechanism, resulting in a large number of assembly steps and increased costs.

It is thus desired to improve a transmission for working machines to facilitate shift control and reduce costs of the transmission.

SUMMARY OF THE INVENTION

According to the present invention, there is provided a transmission for a working machine, which comprises: a drive transmission mechanism and a working transmission mechanism housed in a transmission case; a shift lever swingably provided outside the transmission case; a first operating member for connecting the shift lever to the drive transmission mechanism; and a second operating member for connecting the shift lever to the working transmission mechanism; the shift lever comprising: a first protrusion constantly engaging the first operating member; and a second protrusion arranged to engage with the second operating member when the shift lever is swung in one direction and to disengage from the second operating member when the shift lever is swung in the other direction.

Engagement of the first protrusion with the first operating member with the second protrusion not engaged with the second operating member allows operation of only the drive transmission mechanism. Engagement of the first protrusion with the first operating member with engagement of the second protrusion with the second operating member allows simultaneous operations of both the drive transmission mechanism and the working transmission mechanism. The simple configuration allows the operations of the drive transmission mechanism and the working transmission mechanism, facilitating shift control, and allowing cost reduction and improved operability of the shift lever.

BRIEF DESCRIPTION OF THE DRAWINGS

Preferred embodiments of the present invention will be described in detail below, by way of example only, with reference to the accompanying drawings, in which:

FIGS. 15A, 15B and 15C are diagrams illustrating the movement of the drive transmission mechanism when the shift lever is moved from a drive neutral position to first forward gear;

FIGS. 17A, 17B and 17C are diagrams illustrating the movement of the drive transmission mechanism when the shift lever is moved from the drive neutral position through a working neutral position to working first gear;

DETAILED DESCRIPTION OF THE PREFERRED EMBODIMENTS

A working machine in the present invention is exemplified by a tiller 10 as a walk-behind farm working machine.

Figure 1:
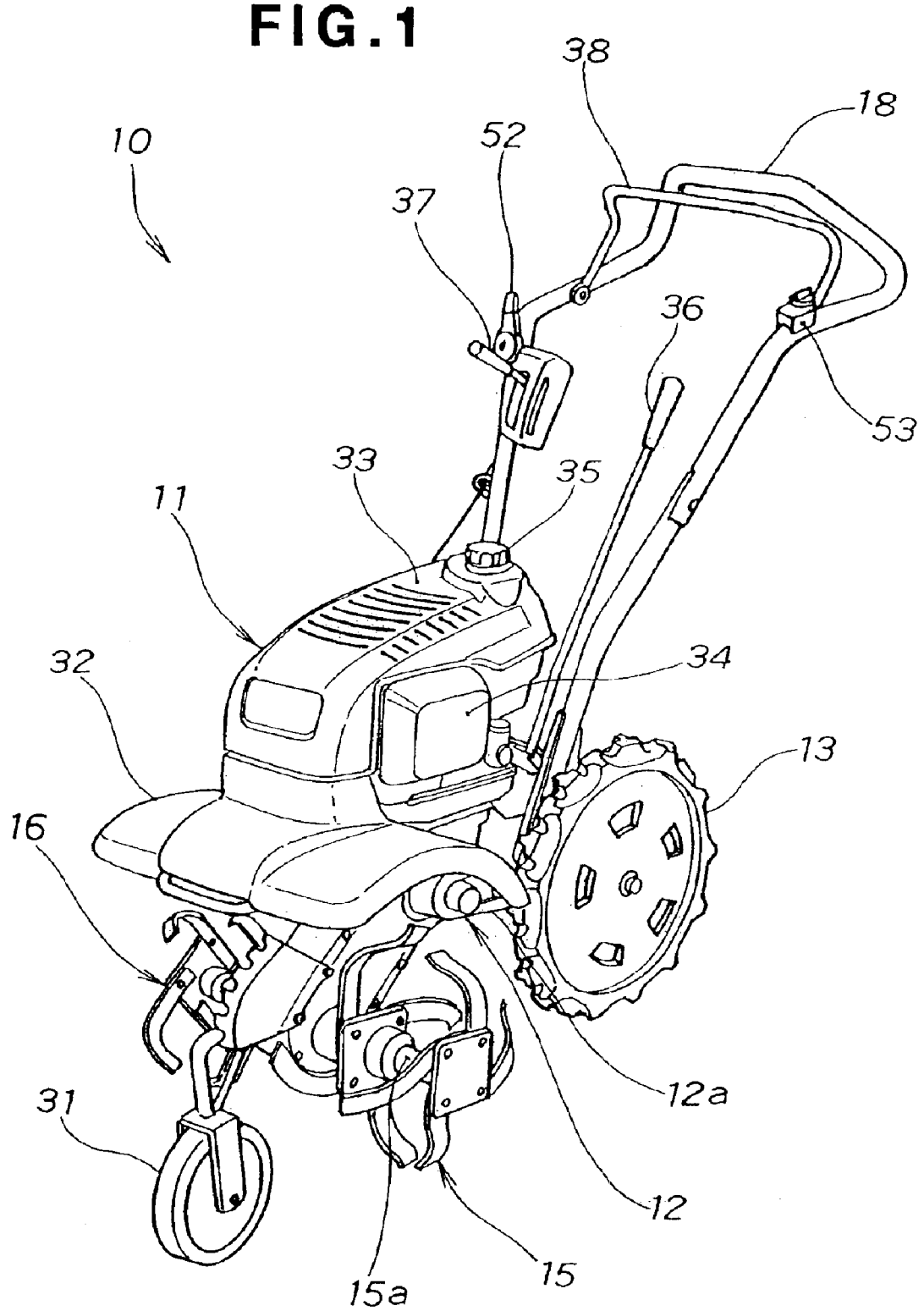
FIG. 1 is a perspective view of a walk-behind tiller provided with a transmission according to the present invention.

The tiller 10 shown in FIG. 1 includes an engine 11. The engine 11 transmits power via a drive unit 12 to left and right drive wheels 13, 14 (see FIG. 3) and left and right tilling devices 15, 16 arranged forward of the drive wheels 13, 14. A working device such as a ridger is connected to the rear of a transmission case 12a constituting a part of the drive unit 12. The tiller 10 plows a field with the tilling devices 15, 16 while making ridges with the ridger.

Figure 2:
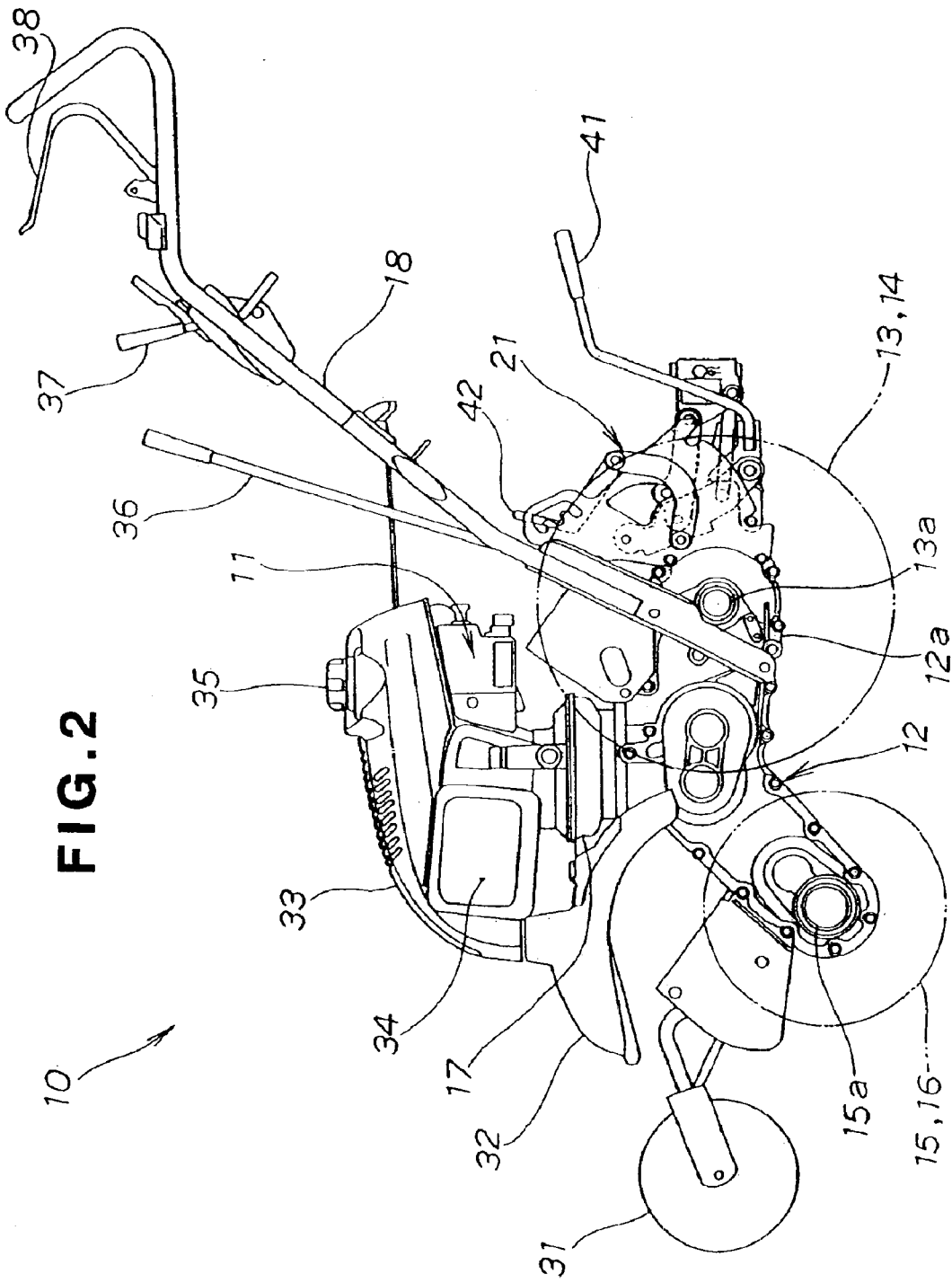
FIG. 2 is a side view of the tiller shown in FIG. 1.

As shown in FIG. 2, the tiller 10 includes the engine 11 disposed on top of the machine body, the drive unit 12 mounted below the engine 11, the tilling devices 15, 16 rotatably mounted to the front of the drive unit 12 via left and right tilling shafts 15a, 16a (see FIG. 6), the drive wheels 13, 14 rotatably mounted to the rear of the drive unit 12 via a left axle 13a and a right axle 14a (see FIG. 3), a handle 18 obliquely extended in a rearward and upward direction from the rear of the transmission case 12a, and a connecting mechanism 21 mounted to the rear end of the transmission case 12a.

A clutch case 17 houses a clutch (described below) constituting a part of the drive unit 12. An auxiliary wheel 31 is mounted to a front end portion of the transmission case 12a in a vertically adjustable manner. A front portion of the transmission case 12a and the top of the tilling devices 15, 16 are covered by a fender 32. An engine cover 33 covers the top of the engine 11.

Reference numeral 34 denotes an air cleaner and 35 a fuel tank filler cap. Reference numeral 36 denotes a shift lever and 37 a differential lock lever. Reference numeral 38 denotes a clutch lever.

A working device connected to the connecting mechanism 21 is tuned up by a lifting lever 41. A sinking position adjustment lever 42 adjusts the sinking position of the working device connected to the connecting mechanism 21.

Figure 3:
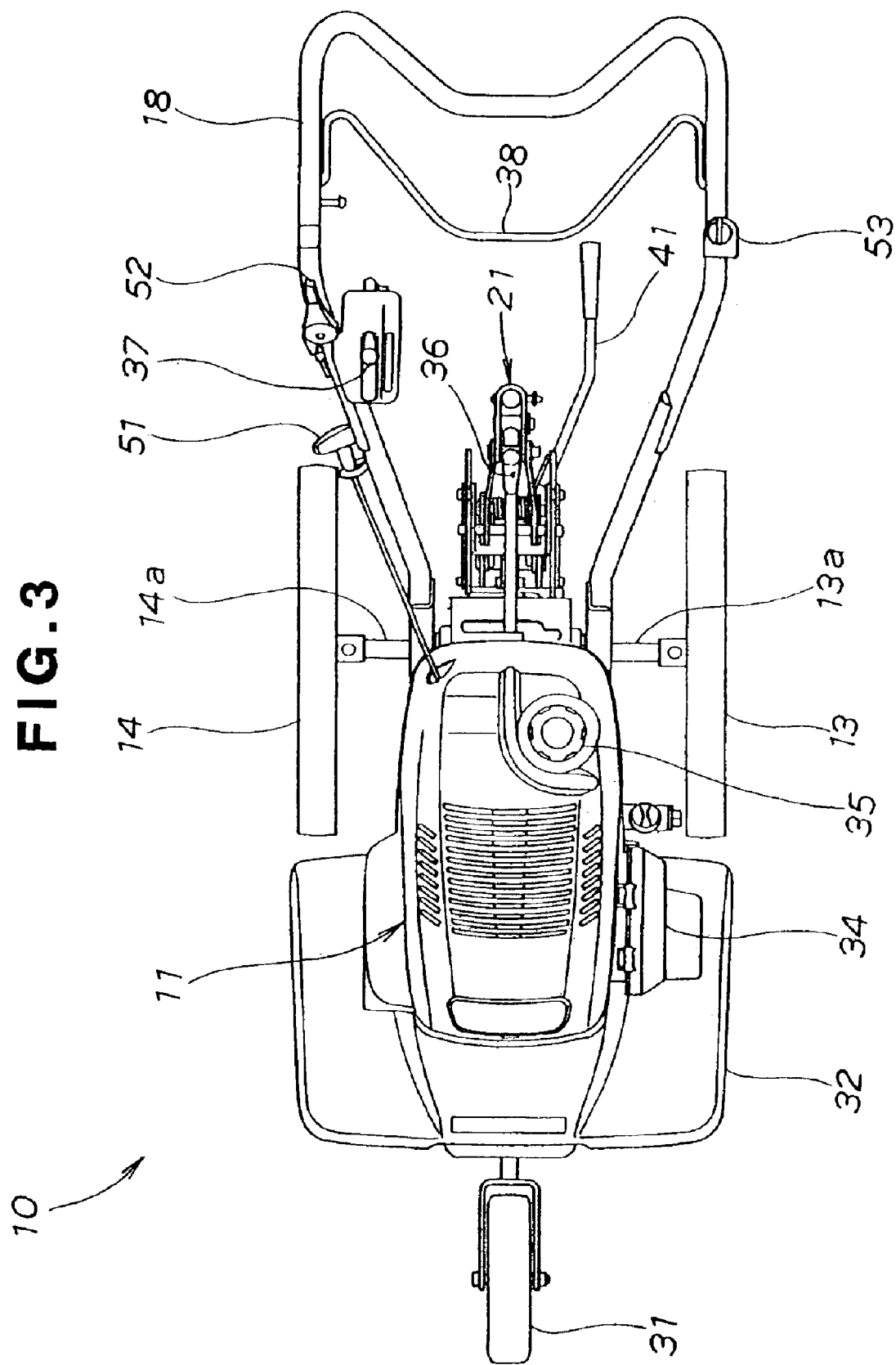
FIG. 3 is a plan view of the tiller shown in FIG. 2.

As shown in FIG. 3, a recoil starter knob 51 for starting the engine 11, a throttle lever 52 for adjusting the rpm of the engine 11 and the diff lock lever 37 are arranged at a right front portion of the handle 18.

An engine switch 53 for making the engine 11 operable or stopping is attached to a left rear portion of the handle 18.

A clutch lever 38 is mounted at a rear portion of the handle 18. The shift lever 36 extends rearward from a rear middle portion of the drive unit 12 (see FIG. 1). The lifting lever 41 extends rearward from a left rear portion of the connecting mechanism 21.

Figure 4:
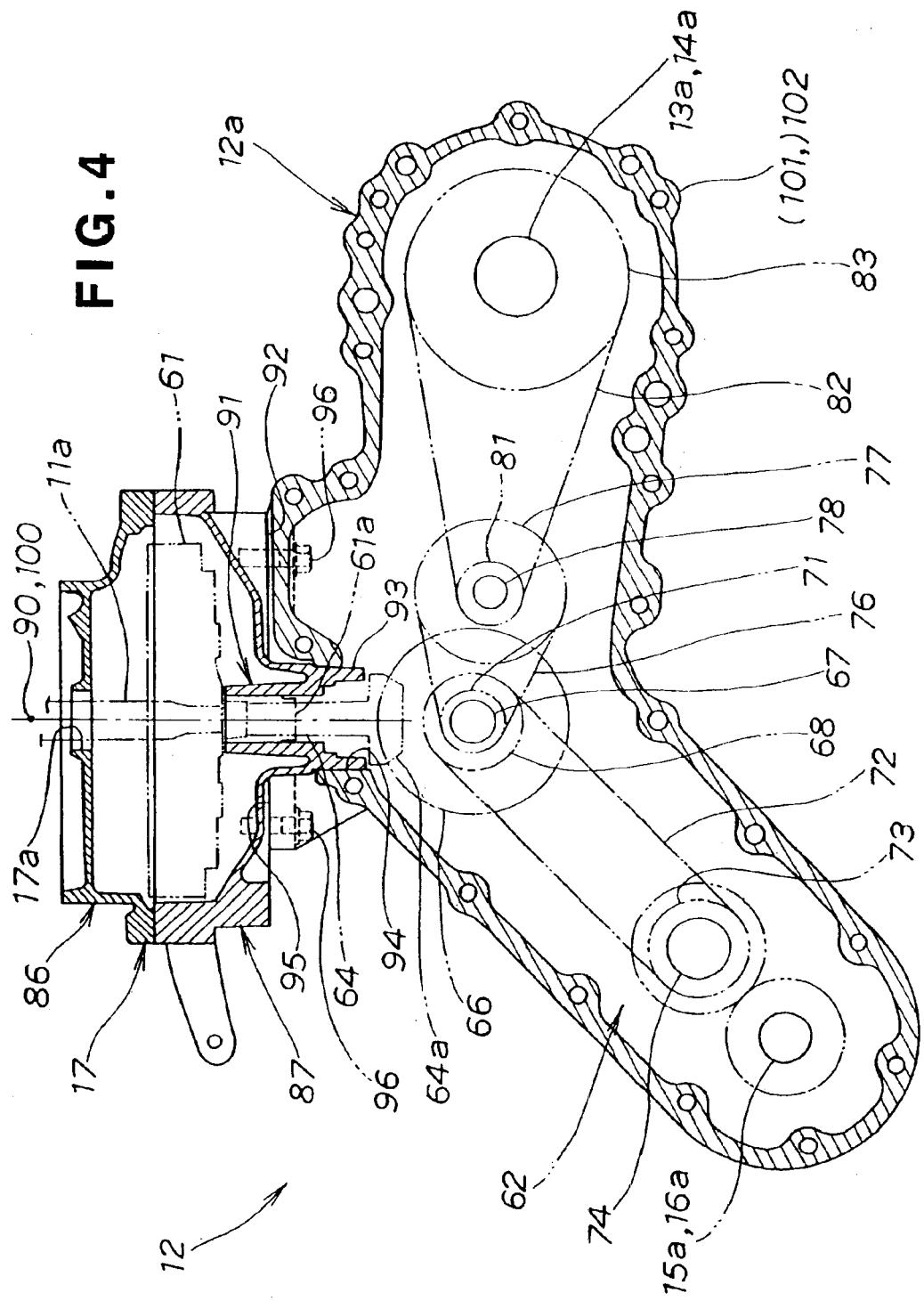
FIG. 4 is a cross-sectional view of a drive unit including the transmission according the present invention.

FIG. 4 illustrates the drive unit 12 including a transmission according to the present invention.

The drive unit 12 is, as shown in FIG. 3, a device for transmitting power of the engine 11 to the drive wheels 13, 14 and the tilling devices 15, 16 (see FIG. 2). The drive unit 12 includes a clutch 61 connected to a crankshaft 11a of the engine 11, a power transmission mechanism 62 connected to the clutch 61, the clutch case 17, and the transmission case 12a housing the power transmission mechanism 62.

An input of the clutch 61 is connected to the crankshaft 11a. A clutch output shaft 61a at the output is connected to an input shaft 64 of the power transmission mechanism 62.

The power transmission mechanism 62 has the input shaft 64, a bevel gear 66, a working shaft 67, a first drive sprocket 68, a second drive sprocket 71, a first driven sprocket 73, an auxiliary tilling shaft 74, the tilling shafts 15a, 16a, a second driven sprocket 77, a drive shaft 78, a third drive sprocket 81, a third driven sprocket 83, and the left and right axles 13a, 14a.

The bevel gear 66 engages a bevel gear 64a formed on the input shaft 64. The working shaft 67 supports the bevel gear 66. The first drive sprocket 68 and second drive sprocket 71 are mounted on the working shaft 67.

The first driven sprocket 73 is connected to the first drive sprocket 68 via a first chain 72. The first driven sprocket 73 is supported on the auxiliary tilling shaft 74.

The tiling shafts 15a, 16a receive driving force from the auxiliary tilling shaft 74 via a plurality of gears.

The second driven sprocket 77 is connected to the second drive sprocket 71 via a second chain 76 and is supported on the drive shaft 78.

The third drive sprocket 81 is integrally formed with the drive shaft 78.

The third driven sprocket 83 is connected to the third drive sprocket 81 via a third chain 82.

The left and right axles 13a, 14a receive driving force from the third driven sprocket 83.

The working shaft 67 and the drive shaft 78 are components of the transmission to be described below.

The clutch case 17 has an upper case 86 having a shaft insertion hole 17a through which the crankshaft 11a is inserted and a lower case 87 attached to the bottom of the upper case 86.

The lower case 87 has a substantially cylindrical bearing 91 rotatably supporting the clutch output shaft 61a and the input shaft 64, and a clutch mounting surface 92 as a first mating surface for mounting to the transmission case 12a.

The bearing 91 has at its lower portion a tubular portion 93 to be fitted to the transmission case 12a.

In the figure, reference numeral 90 denotes a shaft center of the tubular portion 93. The clutch mounting surface 92 is a horizontal plane orthogonal to the shaft center 90.

Figure 5:
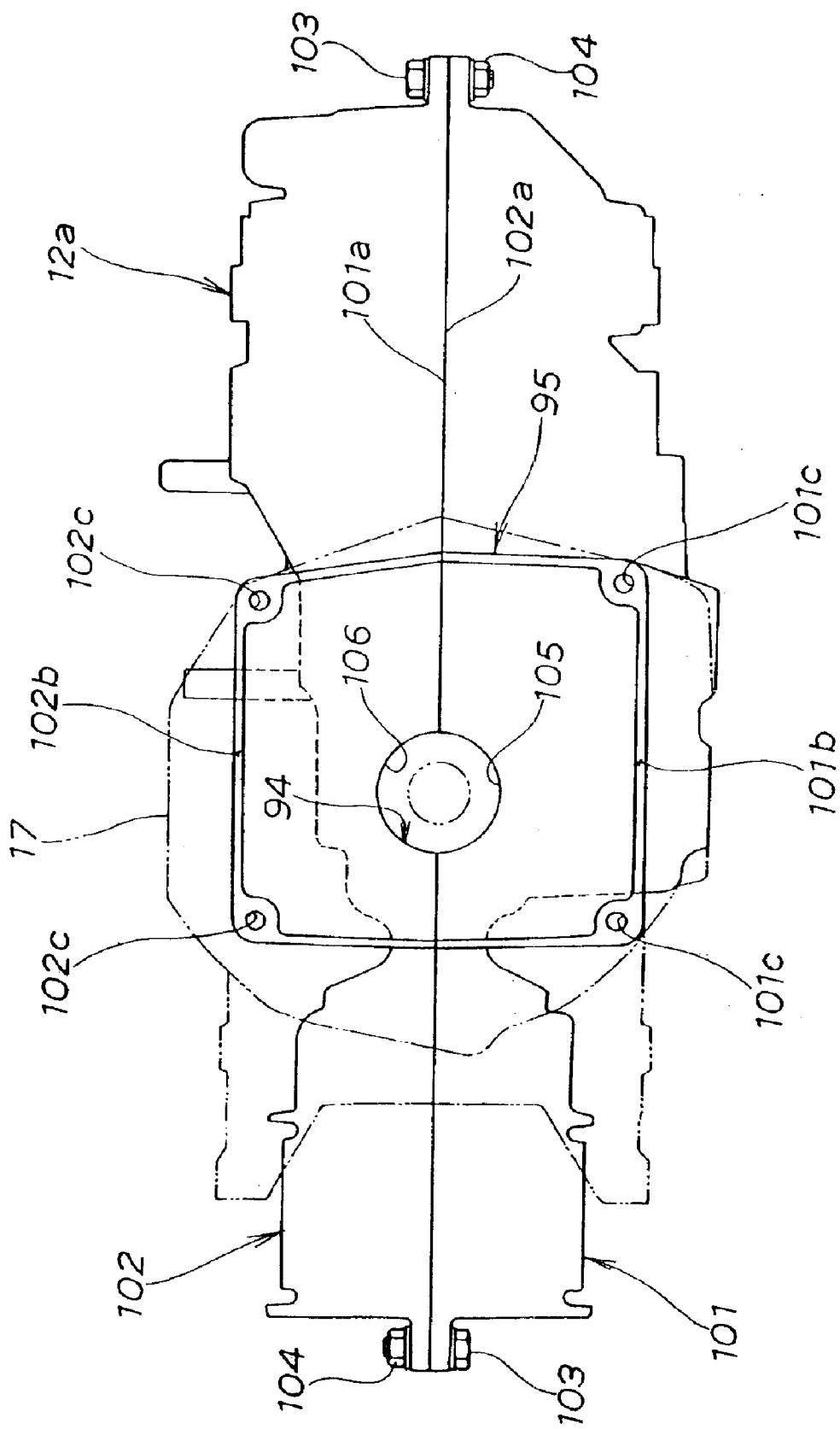
FIG. 5 is a plan view of a transmission case and a clutch case shown in FIG. 4.

The transmission case 12a is, as shown in FIG. 5, split into left and right halves. The transmission case 12a has, at its upper portion, a fitting hole 94 for fitting to the tubular portion 93 of the clutch case 17 and a transmission mounting surface 95 to be attached to the clutch mounting surface 92 of the clutch case 17.

The clutch case 17 and the transmission case 12a are joined by a plurality of bolts 96.

In the figure, reference numeral 100 denotes a shaft center of the fitting hole 94, which agrees with the shaft center 90. The transmission mounting surface 95 is a horizontal plane orthogonal to the shaft center 100.

FIG. 5 illustrates the transmission case 12a shown in solid lines and the clutch case 17 shown in imaginary lines.

The transmission case 12a consists of a left case 101 and a right case 102. The left and right cases 101, 102 are mated together at their respective mating surfaces 101a, 102a. The left case 101 and the right case 102 have, at their upper portions, a substantially U-shaped left mounting surface 101b and right mounting surface 102b, respectively.

The left case 101 and the right case 102 are mated with a plurality of bolts 103 and nuts 104.

The left mounting surface 101b and the right mounting surface 102b constitute the transmission mounting surface 95 shown in FIG. 4, having bolt insertion holes 10c, 10c, 102c, 102c, respectively, for receiving the bolts 96.

The fitting hole 94 of the transmission case 12a consists of a left semicircular hollow 105 formed in a semicircle in the left case 101 and a right semicircular hollow 106 formed in a semicircle in the right case 102.

The transmission mounting surface 95 is a horizontal plane orthogonal to the shaft center 100 shown in FIG. 4. The left mounting surface 101b and the right mounting surface 102b are thus horizontal planes orthogonal to the shaft center 100.

Figure 6:
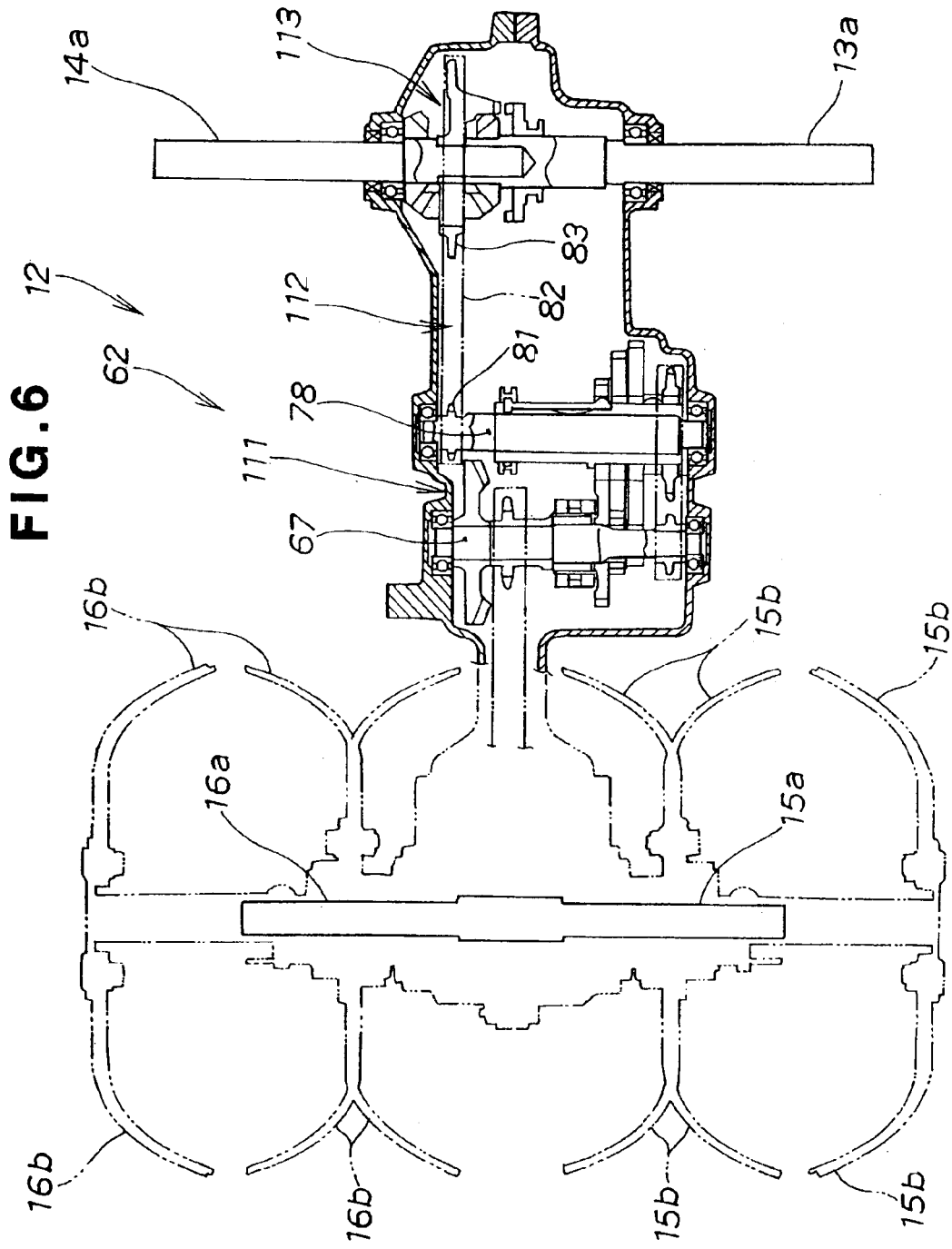
FIG. 6 is a cross-sectional view of the drive unit according to the present invention.

As shown in FIG. 6, the power transmission mechanism 62 of the drive unit 12 includes a transmission 111 having the working shaft 67 and the drive shaft 78, a chain-drive reduction gear 112 connected to the transmission 111, a differential 113 connected to the reduction gear 112, and the left axle 13a and the right axle 14a connected to the left and right of the differential 113.

Reference numerals 15b and 16b denote tillage tines mounted on the tilling shafts 15a, 16a.

The reduction gear 112 includes the third drive sprocket 81, the third driven sprocket 83, and the third chain 82 extended between the third drive sprocket 81 and the third driven sprocket 83.

Figure 7:
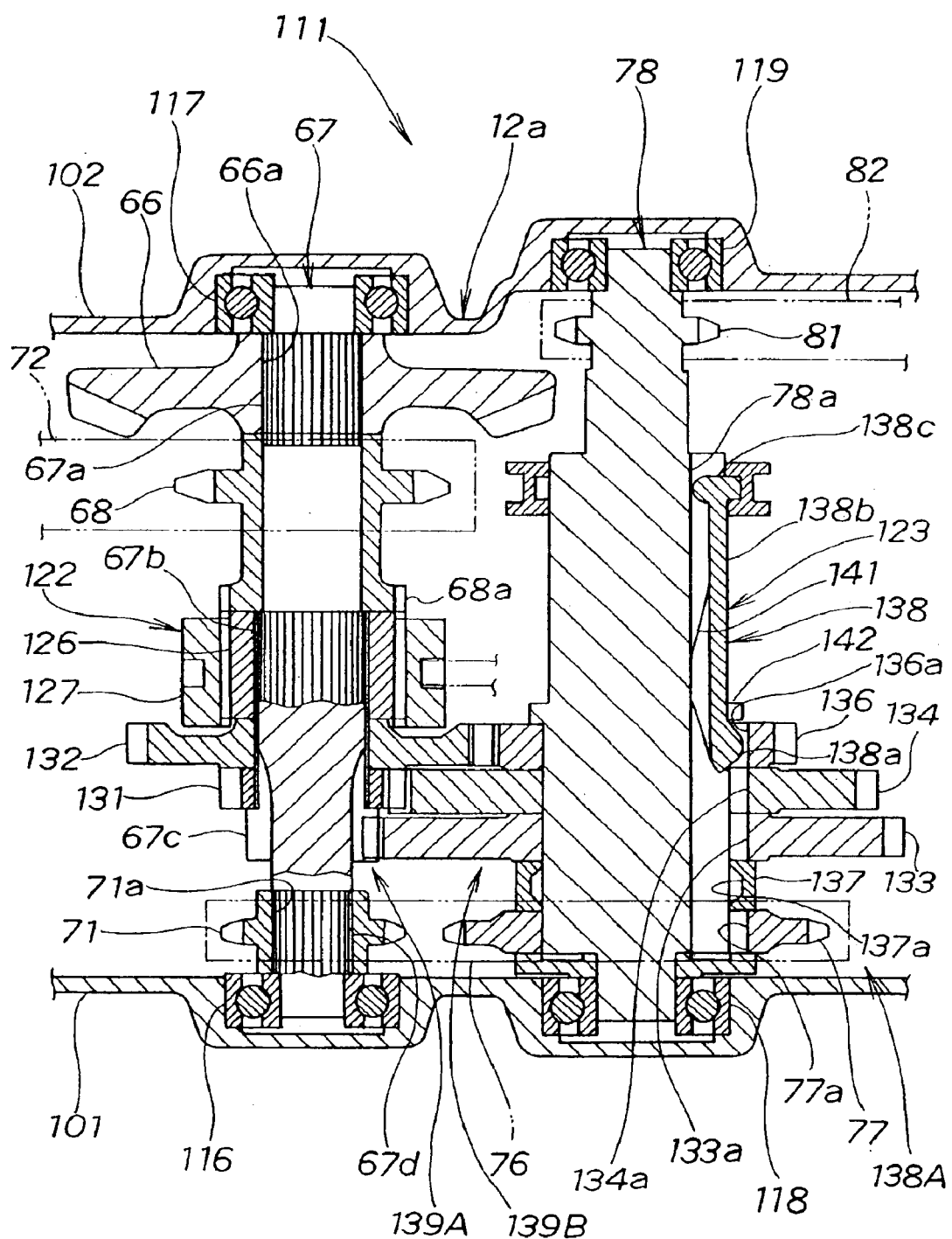
FIG. 7 is an enlarged cross-sectional view of the transmission shown in FIG. 6.

FIG. 7 is an enlarged cross-sectional view of the transmission 111 according to the present invention shown in FIG. 6. The transmission 111 has the working shaft 67 and the drive shaft 78 rotatably mounted to the left case 101 and right case 102 of the transmission case 12a via bearings 116, 117, 118 and 119, a working transmission mechanism 122 provided on the working shaft 67, and a drive transmission mechanism 123 provided on the drive shaft 78.

The working shaft 67 has first male splines 67a spline-coupled to female splines 66a formed in the bevel gear 66, second male splines 67b provided in its intermediate portion, a first drive gear 67c integrally formed therewith for engagement with and the drive transmission mechanism 123, and third male splines 67d spline-coupled to female splines 71a formed in the second drive sprocket 71.

The working transmission mechanism 122 includes the working shaft 67, an input gear 126 spline-coupled to the second male splines 67b on the working shaft 67, a connecting sleeve 127 in engagement with the input gear 126, and the first drive sprocket 68 having mating teeth 68a which engage with the connecting sleeve 127 longitudinally moved along the working shaft 67.

The first drive sprocket 68 is constantly connected to the first driven sprocket 73 shown in FIG. 4 via the first chain 72. The working transmission mechanism 122 is thus a constantly-meshed transmission mechanism.

The drive transmission mechanism 123 includes the drive shaft 78, the first drive gear 67c, a second drive gear 131, a third drive gear 132 and the second drive sprocket 71 on the working shaft 67, the second chain 76, the second driven sprocket 77, a first driven gear 133, a second driven gear 134, a third driven gear 136, a neutral positioning ring 137, and a sliding key 138.

The second and third drive gears 131, 132 are spline-coupled to the second male splines 67b on the working shaft 67.

The first, second and third driven gears 133, 134 and 136 are rotatably fitted onto the drive shaft 78. The first driven gear 133 engages the first drive gear 67c on the working shaft 67. The second driven gear 134 engages the second drive gear 131. The third driven gear 136 engages the third drive gear 132.

The neutral positioning ring 137 is rotatably fitted onto the drive shaft 78 for providing the neutral position in gear shift.

The sliding key 138 is movably disposed in a longitudinal groove 78a formed axially in an external surface of the drive shaft 78.

The drive shaft 78, sliding key 138, neutral positioning ring 137, first driven gear 133, second driven gear 134, third driven gear 136 and second driven sprocket 77 constitute a key-sliding transmission mechanism 138A.

The first driven gear 133, second driven gear 134, third driven gear 136 and second driven sprocket 77 have their respective engaged grooves 133a, 134a, 136a and 77a for engagement with the sliding key 138 in their surfaces along which the drive shaft 78 extends.

The first drive gear 67c, second drive gear 131 and third drive gear 132 constitute a first gear row 139A. The first driven gear 133, second driven gear 134 and third driven gear 136 constitute a second gear row 139B.

The neutral positioning ring 137 has, in its surface along which the drive shaft 78 extends, an engaged hollow 137a for engagement with the sliding key 138.

The sliding key 138 consists of an engaging claw 138a formed for engagement with the engaged grooves 133a, 134a, 136a or 77a or the engaged hollow 137a, a linear portion 138b extending from the engaging claw 138a, and a fixed end 138c formed at the proximal end of the linear portion 138b.

A spring 141 is provided at the back of the engaging claw 138a and the linear portion 138b for pressing the sliding key 138 toward the engaged grooves 133a, 134a, 136a and 77a and the engaged hollow 137a.

Reference numeral 142 denotes a stopper for the sliding key 138. The stopper 142 is mounted on the drive shaft 78.

The first drive gear 67c and first driven gear 133 constitute forward travel first gear. The second drive gear 131 and second driven gear 134 constitute forward travel second gear. The third drive gear 132 and third driven gear 136 constitute forward travel third gear. The second drive sprocket 71, second chain 76 and second driven sprocket 77 constitute reverse travel gear.

Figure 8:
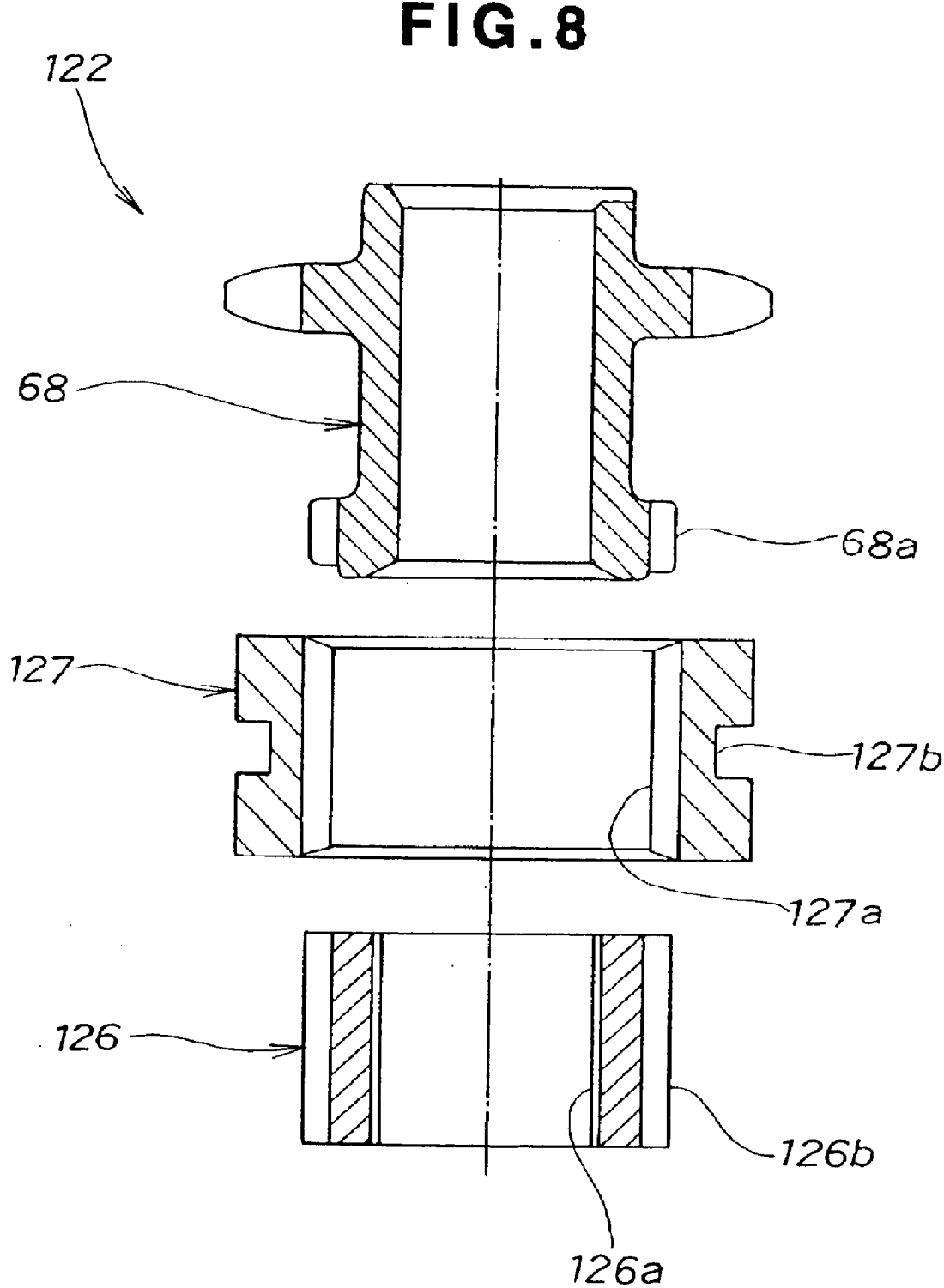
FIG. 8 is a cross-sectional view of a first drive sprocket, a connecting sleeve and an input gear of a working transmission mechanism shown in FIG. 7.

FIG. 8 illustrates the first drive sprocket 68, connecting sleeve 127 and input gear 126 as components of the working transmission mechanism 122 shown in FIG. 7.

In the working transmission mechanism 122, the working shaft 67 and the input gear 126 shown in FIG. 7 are mated by spline-coupling the second male splines 67b formed on the working shaft 67 to female splines 126a formed in the input gear 126.

Teeth 126b formed on the periphery of the input gear 126 mesh with teeth 127a formed in the connecting sleeve 127.

The connecting sleeve 127 is slid along the axis of the input gear 126 toward the first drive sprocket 68, thereby to cause the teeth 127a in the connecting sleeve 127 to mesh with the mating teeth 68a formed on the periphery of the first drive sprocket 68. The connecting sleeve 127 has an annular groove 127b formed in its peripheral surface.

The connecting sleeve 127 and the first drive sprocket 68 to be coupled together are on the same working shaft 67. When the connecting sleeve 127 is connected to the first drive sprocket 68, the teeth 127a of the connecting sleeve 127 smoothly mesh with the mating teeth 68a of the first drive sprocket 68a, hardly causing noise (due to disagreement in revolution speed of gears in gear shift), and hardly causing tooth wear or breakage. In the case where two shafts are arranged in parallel and a gear C sidably mounted on one shaft is selectively mated with either of two gears A and B mounted on the other shaft (such a transmission mechanism is referred to as a "selective-sliding transmission mechanism"), the gears A and C (or gears B and C) cannot easily engage with one another and are likely to cause noise or tooth breakage.

FIG. 9A illustrates a working shift member 145 as a second operating member provided to the working transmission mechanism 122. FIG. 9B illustrates a drive shift member 157 as a first operating member provided to the drive transmission mechanism 123.

Referring to FIG. 9A, the working shift member 145 includes a working shift rod 146 axially sidably mounted to the transmission case 12a, a working fork member 147 mounted on an intermediate portion of the working shift rod 146 to be fitted into the annular groove 127b of the connecting sleeve 127, and a working arm member 148 attached to an end of the working shift member 146 protruded outward of the transmission case 12a for engagement with the shift lever 36 (see FIG. 3).

The working arm member 148 is attached to the working shift rod 146 with a bolt 149 and has an engaged hollow 148a for engagement with the shift lever 36.

For supporting the working shift rod 146, the left case 101 has a hole 101d for receiving a distal end portion of the working shift rod 146, and a working step-sliding mechanism 153 for sliding the working shift rod 146 in steps by pressing a ball 151 with a spring 152 against one of a plurality of circular hollows 146a provided in the distal end portion of the working shift rod 146.

The right case 102 has a through hole 102d for passing the working shift rod 146 therethrough and a dust seal 154 provided adjacently to the through hole 102d.

As shown in FIG. 9B, the drive shift member 157 includes a drive shift rod 158 axially slidably mounted to the transmission case 12a, an H-shaped section annular member 161 with which the fixed end 138c of the sliding key 138 engages, a drive fork member 162 mounted on an intermediate portion of the drive shift rod 158 for insertion into an annular groove 161a formed in the external surface of the annular member 161, and a drive arm member 163 attached to an end of the drive shift rod 158 protruded outward of the transmission case 12a for engagement with the shift lever 36 (see FIG. 3).

The drive arm member 163 is attached to the drive shift rod 158 via a bolt 149 and has an engaged hollow 163a for engagement with the shift lever 36.

For supporting the drive shift rod 158, the left case 101 has a hole 101e for receiving a distal end portion of the drive shift rod 158, and a drive step-sliding mechanism 165 for sliding the drive shift rod 158 in steps by pressing a ball 151 with a spring 152 against one of a plurality of circular hollows 158a formed in the distal end portion of the drive shift rod 158.

The right case 102 has a through hole 102e for passing the drive shift rod 158 therethrough and a dust seal 166 provided adjacently to the through hole 102e.

Figure 10:
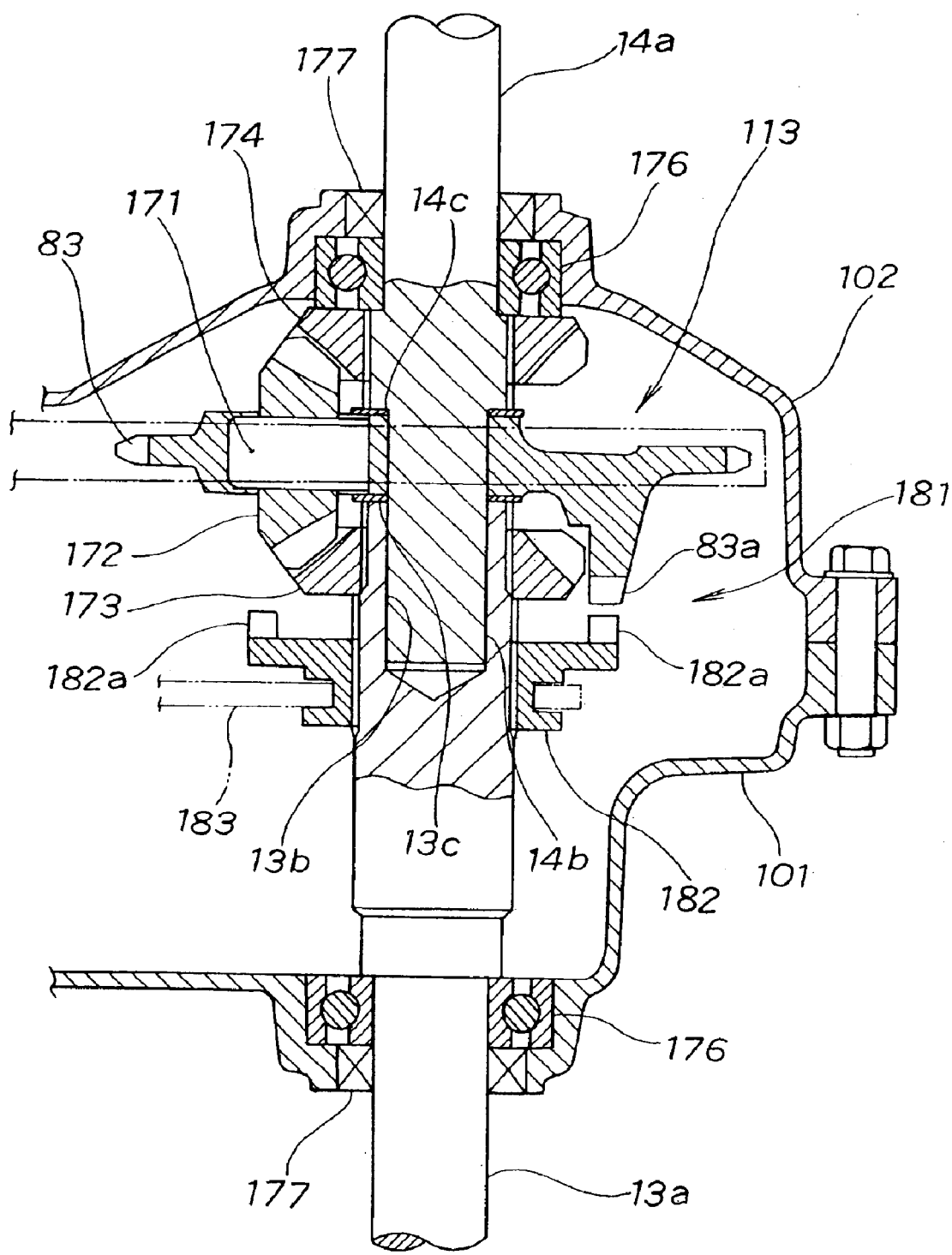
FIG. 10 is an enlarged cross-sectional view of a differential of FIG. 6.

FIG. 10 illustrates the differential 113. The differential 113 absorbs rotational difference between the drive wheels 13, 14 (see FIG. 3) when the tiller 10 (see FIG. 3) turns, allowing smooth turning.

The differential 113 includes the third driven sprocket 83, a plurality of support shafts 171 (only one shown in the figure) mounted to the third driven sprocket 83 in a radially extending manner, a plurality of small differential bevel gears 172 (only one shown in the figure) rotatably mounted on the support shafts 171, a left large differential bevel gear 173 engaging the small differential bevel gears 172 and spline-coupled to the left axle 13a, and a right large differential bevel gear 174 engaging the small differential bevel gears 172 and spline-coupled to the right axle 14a.

The left axle 13a and the right axle 14a are rotatably supported by the left case 101 and the right case 102 via bearings 176, 176. Reference numerals 177, 177 denote dust seals.

The left axle 13a has a fitting hollow 13b in its end. The right axle 14a has a fitting protrusion 14b at its end. The fitting protrusion 14b is rotatably fitted into the fitting hollow 13b via the third driven sprocket 83 for connection between the left axle 13a and the right axle 14a.

Reference numerals 13c and 14c denote bushes provided between the third driven sprocket 83 and the axles 13a, 14a.

The differential lock mechanism 181 stops the function of the differential 113 to rotate the left axle 13a and the right axle 14a in a unit.

The differential lock mechanism 181 includes a lock member 182 spline-coupled to the left axle 13a, a slider 183 for axially sliding the lock member 182, the differential lock lever 37 shown in FIG. 3, and a cable (not shown) connecting the slider 183 to the differential lock lever 37.

Operation of the differential lock lever 37 causes the lock member 182 to slide. Claws 182a, 182a of the lock member 182 are connected to a laterally protruding portion 83a formed on the third driven sprocket 83. The left axle 13a and the third driven sprocket 83 rotate together. That is, the left axle 13a and the right axle 14a rotate in a unit.

Figure 11:
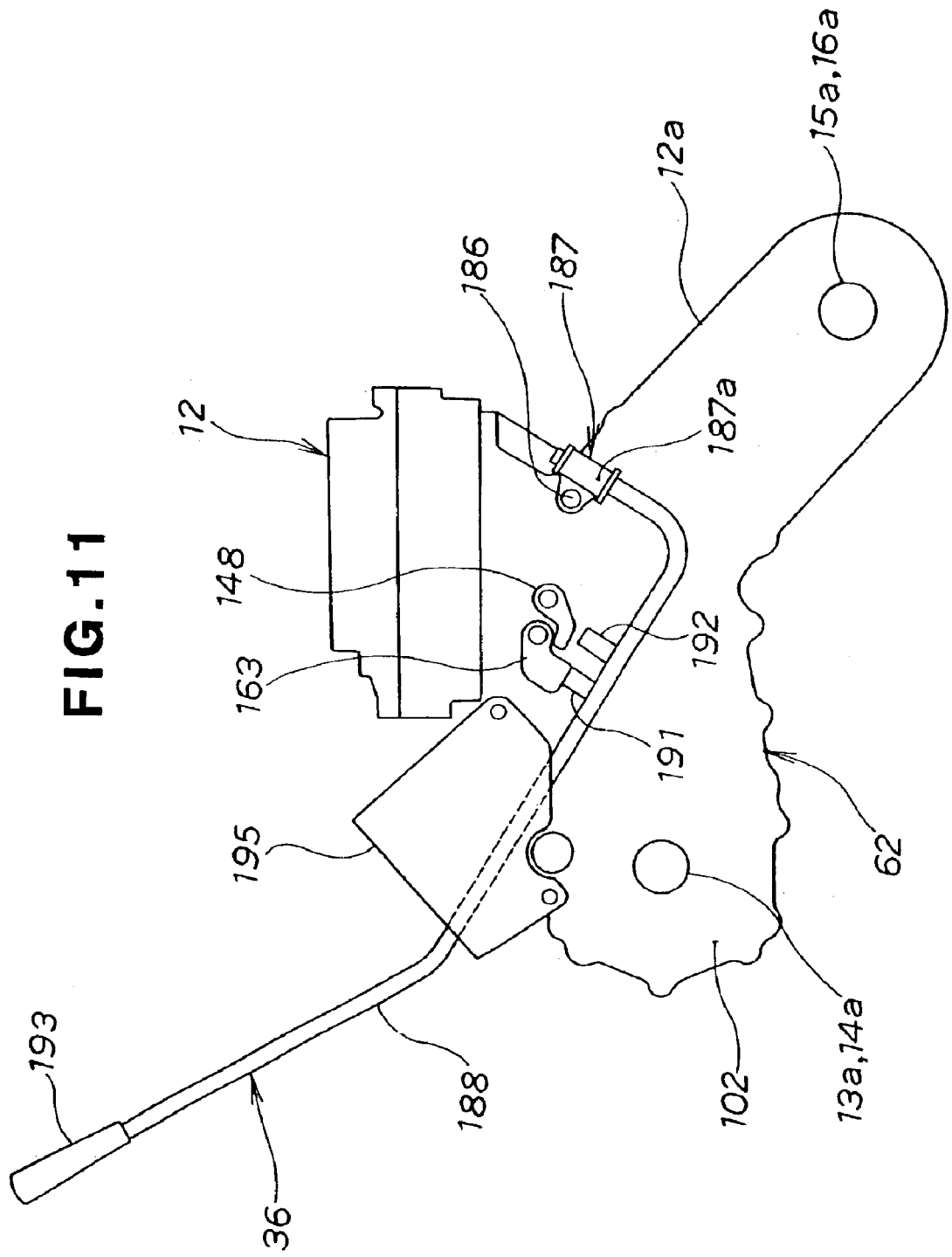
FIG. 11 is a side view of a shift lever mounted to the transmission case.

FIG. 11 illustrates the shift lever 36 mounted to the right case 102 of the transmission case 12a.

The shift lever 36 is a substantially L-shaped member including a base member 187 swingably mounted to a support shaft 186 provided at the right case 102, a lever body 188 swingably attached at its distal end to a tube 187a provided at the base member 187, a first protrusion 191 and a second protrusion 192 protruded upward from an intermediate portion of the lever body 188, and a grip 193 attached to the proximal end of the lever body 188.

The lever body 188 passes through a shift guide panel 195 mounted on the transmission case 12a.

Figure 12:
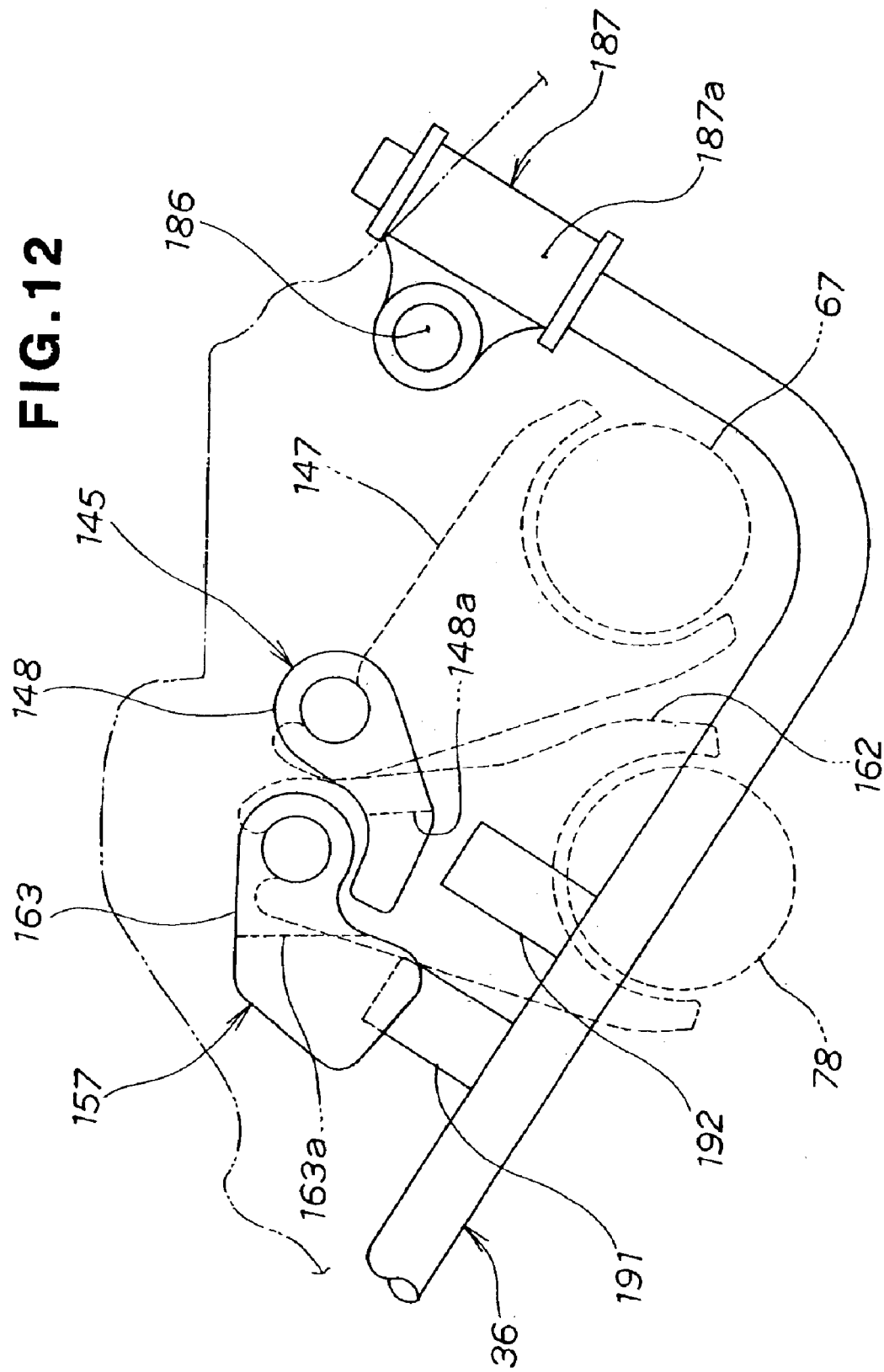
FIG. 12 is a diagram illustrating the relationship between the shift lever shown in FIG. 11, a working arm member and a drive arm member.

FIG. 12 partly illustrates the shift lever 36 in an enlarged view.

The first protrusion 191 of the shift lever 36 is opposite to the drive arm member 163 of the drive shift member 157. The second protrusion 192 is opposite to the working arm member 148 of the working shift member 145.

FIG. 12 illustrates the position of the shift lever 36 when the transmission 111 (see FIG. 7) is in drive neutral. Specifically, the first protrusion 191 is engaged with the engaged hollow 163a of the drive arm member 163, and the second protrusion 192 is not engaged with the engaged hollow 148a of the working arm member 148. The working fork member 147 and the drive fork member 162 are shown in broken lines.

Figure 13A:
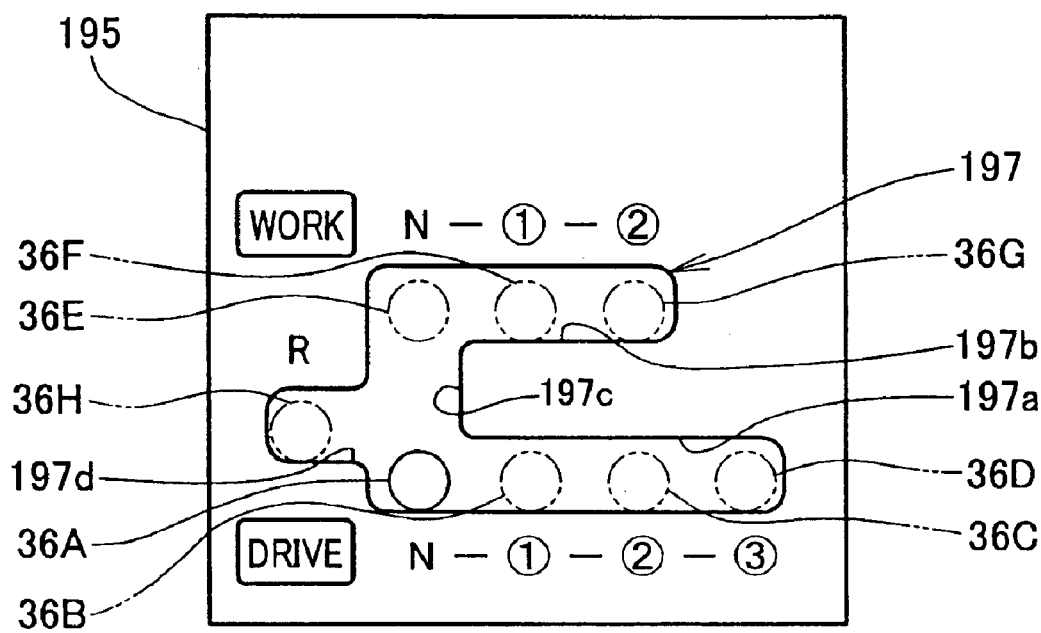
FIGS. 13A and 13B are diagrams showing shift patterns of the shift lever in an embodiment and in a comparative example.
Figure 13B:
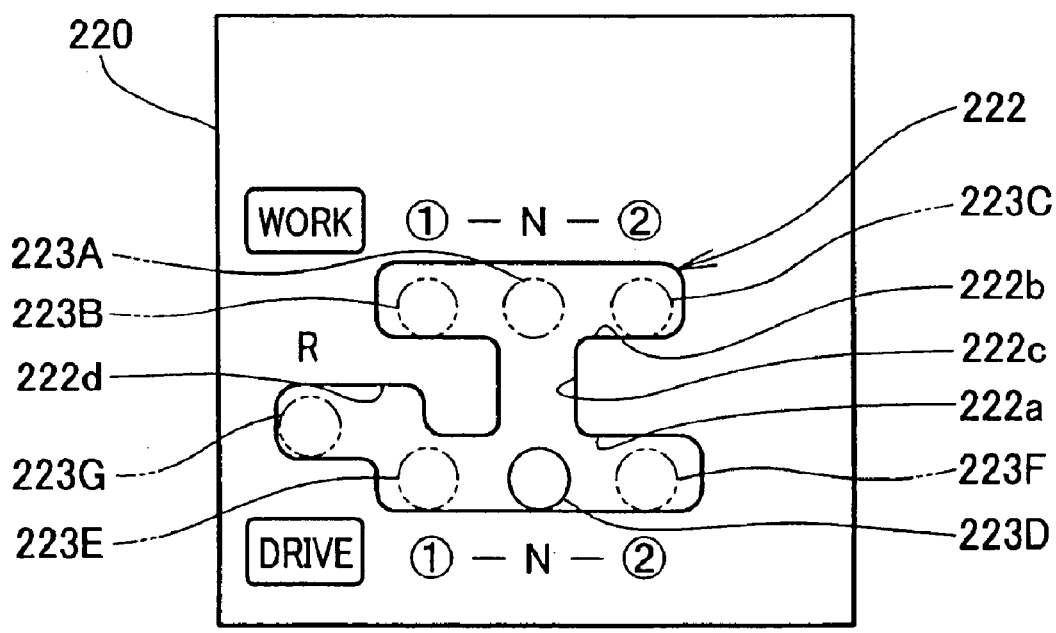

FIGS. 13A and 13B illustrate shift patterns of the shift lever 36 in this embodiment and in a comparative example.

In the embodiment shown in FIG. 13A, the shift guide panel 195 has a guide hole 197 for guiding the shift lever 36 (see FIG. 12).

The guide hole 197 has a drive slot 197a, a working slot 197b provided in parallel with the drive slot 197a, a connecting hole 197c connecting the drive slot 197a and the working slot 197b at their respective ends, and a lateral hole 197d laterally protruded from the connecting hole 197c.

The drive slot 197a allows the shift lever 36 to be moved to a drive neutral position 36A (position N on the drive side), a first forward gear position 36B (position ① on the drive side), a second forward gear position 36c (position ② on the drive side) and a third forward gear position 36D (position ③ on the drive side) for propelling the tiller 10, which are sequential from the left.

The working slot 197b allows the shift lever 36 to be moved to a working neutral position 36E (position N on the working side), a working first gear position 36F (position ① on the working side) and a working second gear position 36G (position ② on the working side), which are sequential from the left.

The working first gear position 36F is for forward travel in first gear while operating the tilling devices 15, 16 (see FIG. 1). The working second gear position 36G is for forward travel in second gear while operating the tilling devices 15, 16.

The lateral hole 197d receives the shift lever 36 to a reverse position 36H for moving the tiller 10 backward.

In this manner, the shift pattern in this embodiment allows gradual increase of speed in shifting from the neutral positions 36A, 36E on the drive side and the working side, facilitating intuitive recognition of the shift pattern, and facilitating shift control.

In the comparative example in FIG. 13B, the shift guide panel 220 has a guide hole 222 for guiding the shift lever 36.

The guide hole 222 has a drive slot 222a, a working slot 222b provided in parallel with the drive slot 222a, a connecting hole 222c connecting middle portions of the drive slot 222a and the working slot 222b, and a lateral hole 222d laterally extended from and end of the drive slot 222a, being offset toward the working slot 222b.

As for the position of the shift lever 36, reference sign 223A denotes a working neutral position, 223B a working first forward gear position, 223C a working second forward gear position, 223D a drive neutral position, 223E a drive first gear position, 223F a drive second gear position, and 223G a reverse position.

In the shift pattern in this comparative example, the neutral positions 223A and 223D on the drive side and on the work side are both positioned between first gear and second gear. It is necessary to shift the lever 36 through the neutral positions 223A and 223D to shift from first gear to second gear or from second gear to first gear, resulting in poor operability as compared with the shift pattern in the embodiment shown in FIG. 13A.

Figure 14:
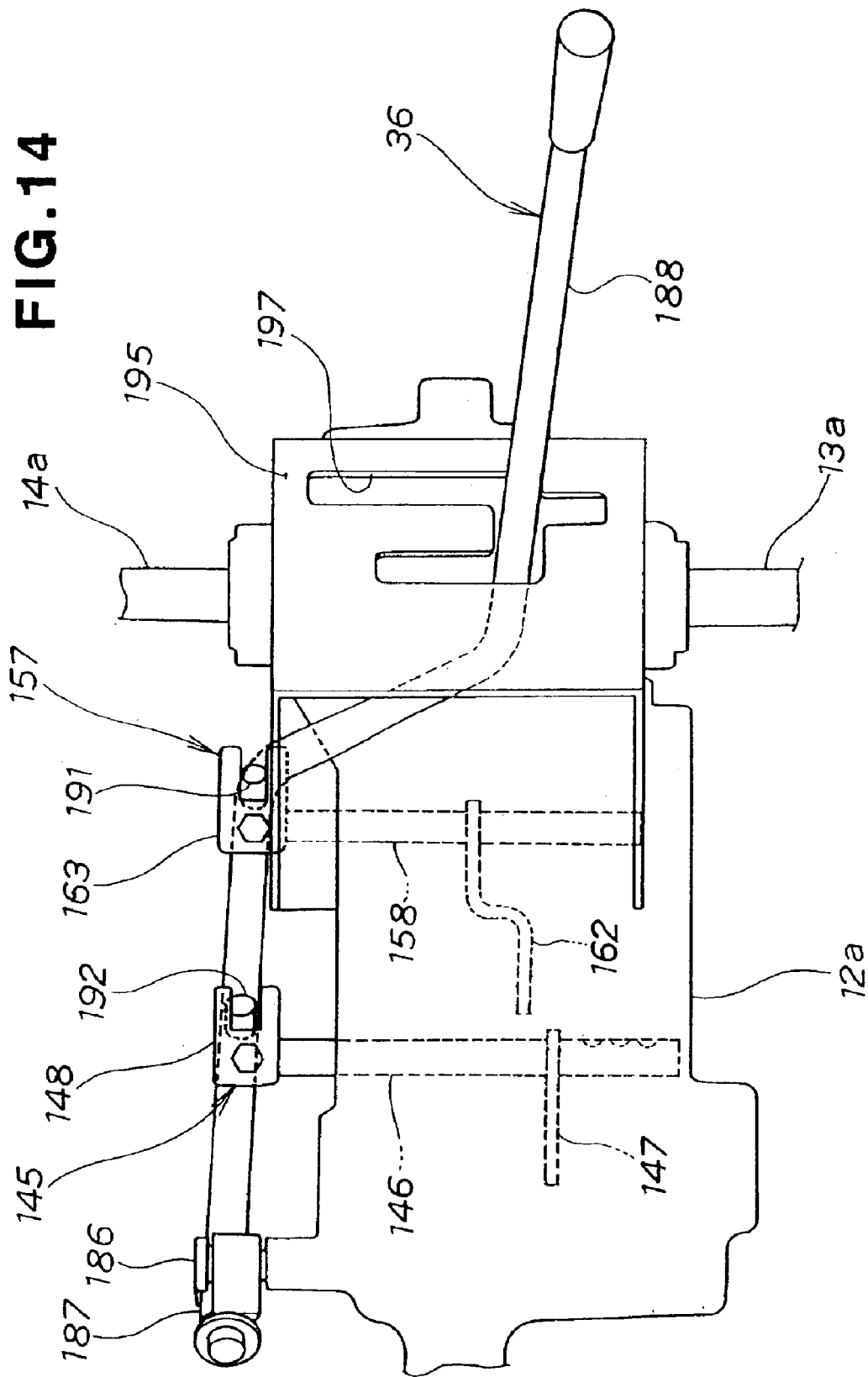
FIG. 14 is plan view of the transmission case having the shift lever.

FIG. 14 illustrates the relationship between the shift lever 36, drive arm member 163 and working arm member 148.

Specifically, it is shown that the shift lever 36 is located in the drive neutral position 36A (see FIG. 13A), the first protrusion 191 of the shift lever 36 is engaged with the drive arm member 163 of the drive shift member 157, and the second protrusion 192 is not engaged with the working arm member 148 of the working shift member 145.

The function of the above-described transmission 111 will be described below.

FIGS. 15A, 15B and 15C illustrate the function of the drive transmission mechanism 123.

Referring to FIG. 15A, the shift lever 36 is moved from the drive neutral position 36A to the first forward gear position 36B.

At that time, as shown in FIG. 15B, the first protrusion 191 is engaged with the drive arm member 163 and the second protrusion 192 is not engaged with the working arm member 148. Swinging the lever body 188 toward the front of the figure sheet about the tube 187a to move the shift lever 36 as shown in FIG. 15A causes the first protrusion 191 to move, with which the drive shift rod 158 slides outward, that is, in the direction of an arrow, as shown in FIG. 15C.

As a result, the drive fork member 162 moves, via the annular member 161, the engaging claw 138a of the sliding key 138 from within the engaged hollow 137a of the neutral positioning ring 137 to the engaged groove 133a of the first driven gear 133. The fist driven gear 133 and the drive shaft 78 are allowed to rotate together, transmitting power from the first drive gear 67c (see FIG. 7) to the drive shaft 78.

Similarly, as in FIGS. 15A and 15C, movement of the shift lever 36 from the first forward gear position 36B to the second forward gear position 36C causes the sliding key 138 to provide connection between the second driven gear 134 and the drive shaft 78. Power is transmitted from the second drive gear 131 (see FIG. 7) to the drive shaft 78. Movement of the shift lever 36 from the second forward gear position 36C to the third forward gear position 36D causes the sliding key 138 to provide connection between the third driven gear 136 and the drive shaft 78. Power is transmitted from the third drive gear 132 (see FIG. 7) to the drive shaft 78.

Figure 16A:
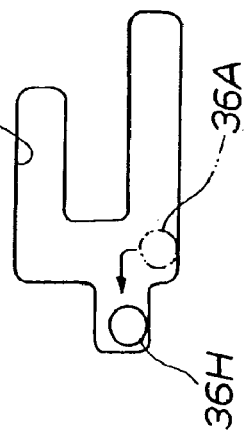
FIGS. 16A, 16B and 16C are diagrams illustrating the movement of the drive transmission mechanism when the shift lever is moved from the drive neutral position to a reverse position.
Figure 16C:
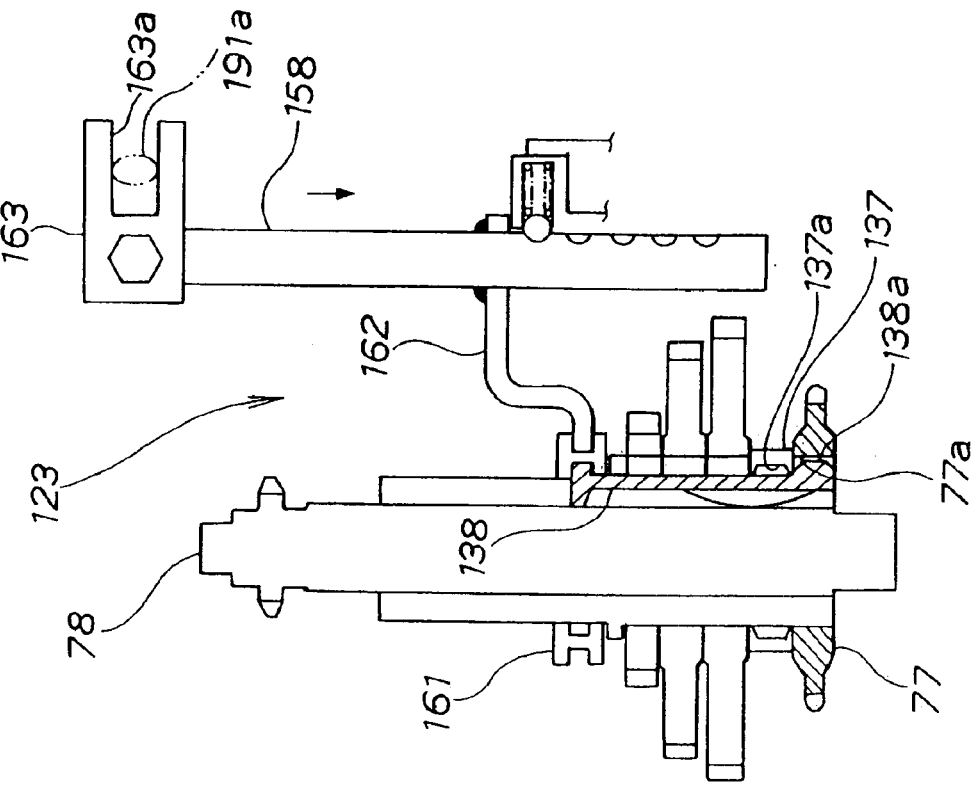
Figure 16B:
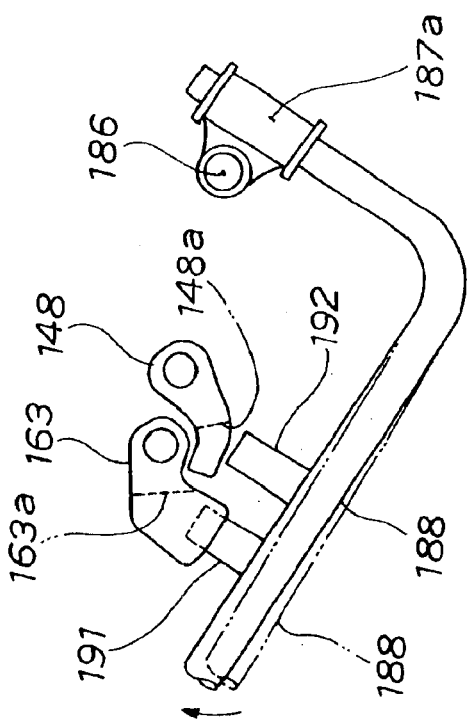
Figure 18:
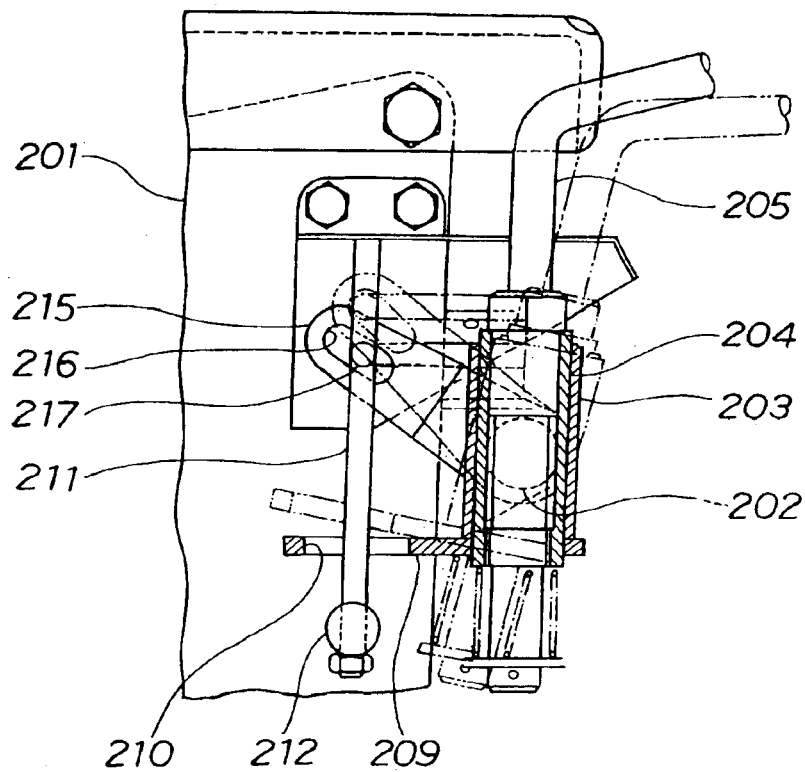
FIG. 18 is a side view of a conventional transmission for working machines.
Figure 19:
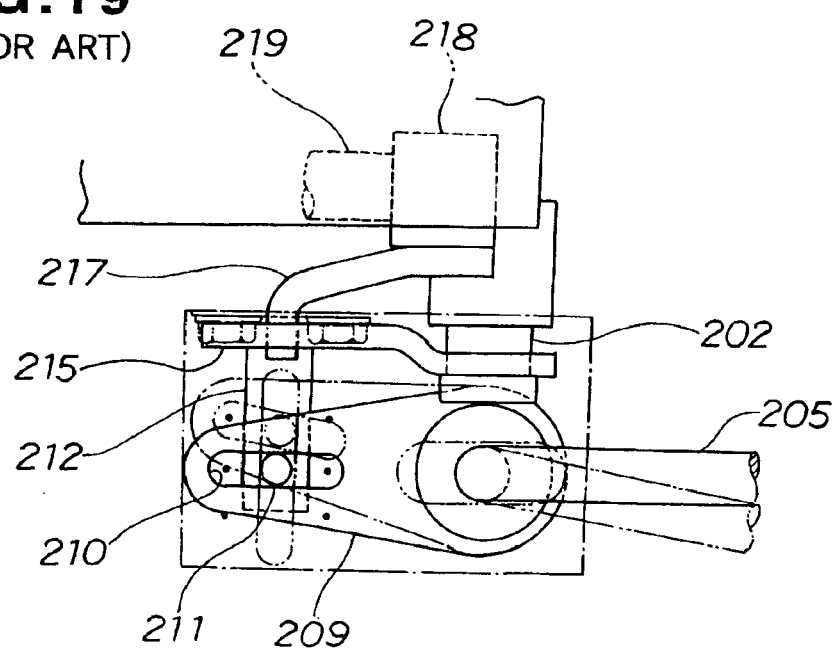
FIG. 19 is a plan view of the transmission in FIG. 18.

FIGS. 16A, 16B and 16C illustrate the state in which the shift lever 36 is located in the reverse position 36H.

Referring to FIG. 16A, the shift lever 36 is moved from the drive neutral position 36A to the reverse position 36H.

At that time, as shown in FIG. 16B, the lever body 188 is slightly swung in the direction of an arrow about the support shaft 186. The first protrusion 191 is in engagement with the drive arm member 163 and the second protrusion 192 is not engaged with the working arm member 18. The lever body 188 is swung toward the back of the figure sheet about the tube 187a to move the shift lever 36 as shown in FIG. 16A. As shown in FIG. 16C, with the movement of the first protrusion 191, the drive shift rod 158 slides in the direction of an arrow.

As a result, the drive fork member 162 moves, via the annular member 161, the engaging claw 138a of the sliding key 138 from within the engaged hollow 137a of the neutral positioning ring 137 to the engaged groove 77a of the second driven sprocket 77. The second driven sprocket 77 and the drive shaft 78 are allowed to rotate together, transmitting power from the second drive sprocket 71 (see FIG. 4) to the drive shaft 78. At that time, the drive shaft 78 rotates in a direction opposite to that as described with FIG. 15C.

FIGS. 17A, 17B and 17C illustrate the operation of the working transmission mechanism 122.

Referring to FIG. 17A, the shift lever 36 is moved from the drive neutral position 36A through the working neutral position 36E to the working first gear position 36F.

At that time, as shown in FIG. 17B, the lever body 188 is swung in the direction of an arrow about the support shaft 186. The first protrusion 191 is engaged with the drive arm member 163 and the second protrusion 192 is also engaged with the working arm member 148.

The lever body 188 is swung toward the front of the figure sheet about the tube 187a to move the shift lever as shown in FIG. 17A. With the movement of the second protrusion 192, the working shift rod 146 slides outward, that is, in the direction of an arrow as shown in FIG. 17C. At that time, the drive shift rod 158 shown in FIG. 15C also slides.

The connecting sleeve 127 is moved by the working fork member 147 to engage with the mating teeth 68a of the first drive sprocket 68. The working shaft 67 and the first drive sprocket 68 rotate together, transmitting power from the working shaft 67 via the first chain 72 (see FIG. 4) to the auxiliary tilling shaft 74 (see FIG. 4).

In a similar manner, as in FIGS. 17A and 17C, when the shift lever 36 moves from the working first gear position 36F to the working second gear position 36G, the working fork member 147 moves to a position shown by imaginary lines, causing the connecting sleeve 127 to further slide, maintaining the engagement with the mating teeth 68a.

When the shift lever 36 is in the working first gear position 36F, the tiller 10 can travel forward in first gear while the tilling devices 15, 16 (see FIG. 1) operate. When the shift lever 36 is in the working second gear position 36G, the tiller 10 can travel forward in second gear while the tilling devices 15, 16 operate.

Figure 9:
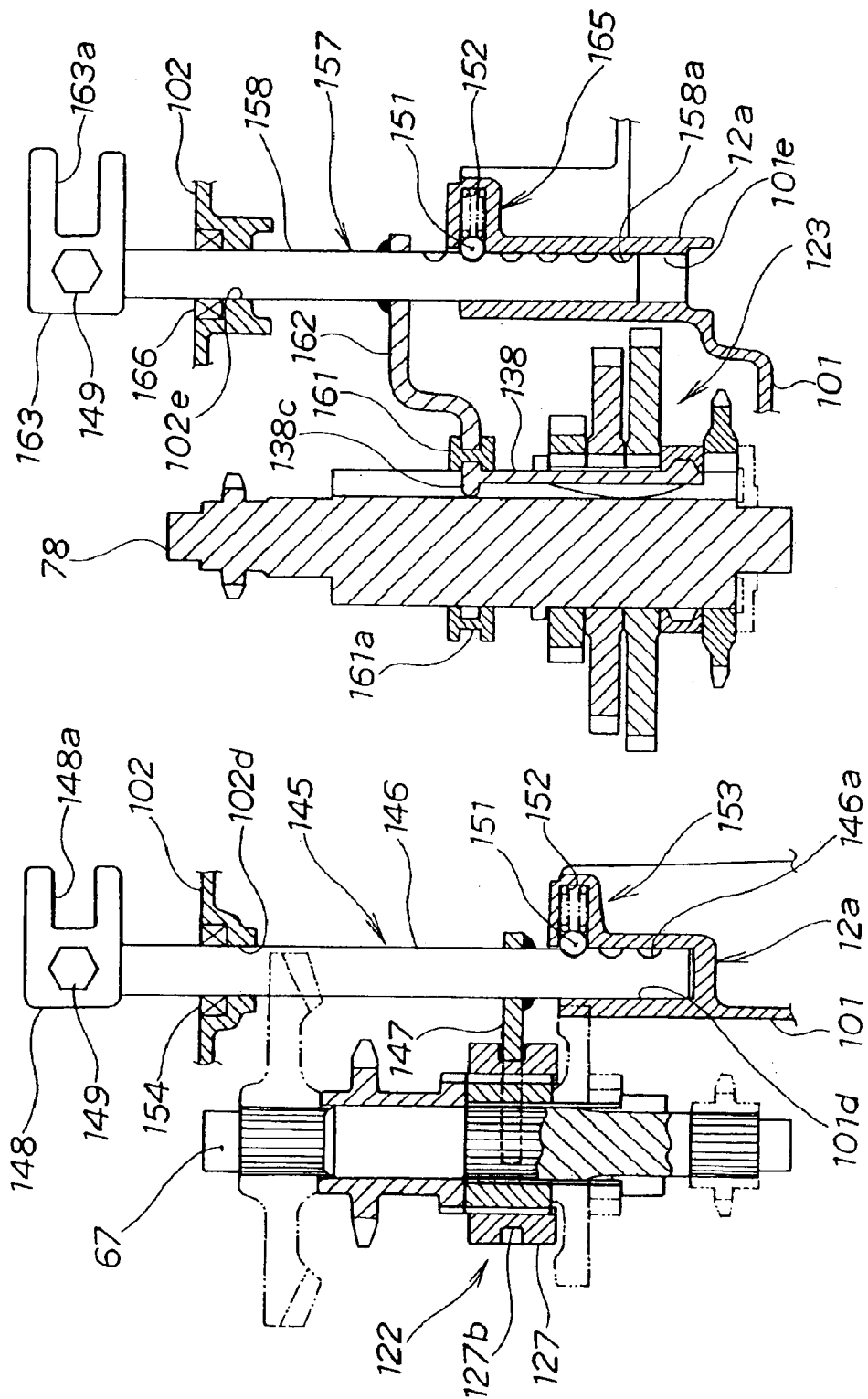
FIGS. 9A and 9B are cross-sectional views of the working transmission mechanism provided with a working shift member and a drive transmission mechanism provided with a drive shift member.

As described with reference to FIGS. 9 and 12, the present invention is characterized in that, in the transmission 111 of the tiller 10 (see FIG. 1) in which the drive transmission mechanism 123 and the working transmission mechanism 122 are housed in the transmission case 12a, the single shift lever 36 is swingably provided outside the transmission case 12a, and the drive transmission mechanism 123 is connected to the shift lever 36 via the drive shit member 157 and the working transmission mechanism 122 is connected to the shift lever 36 via the working shift member 45 for shift controls by the transmission mechanism 122, 123, the shift lever 36 is provided with the first protrusion 191 constantly engaging the drive shift member 157 and the second protrusion 192 arranged to engage with the working shift member 145 when the shift lever 36 is swung in one direction and to disengage from the working shift member 145 when the shift lever 36 is swung in the other direction (that is, the opposite direction).

Engagement of the first protrusion with the drive shift member 157 with the second protrusion 192 not engaged with the working shift member 145 allows operation of only the drive transmission mechanism 123. Engagement of the first protrusion 191 with the drive shift member 157 with engagement of the second protrusion 192 with the working shift member 145 allows simultaneous operations of both the drive transmission mechanism 123 and the working transmission mechanism 122. The simple configuration allows the operations of the drive transmission mechanism 123 and the working transmission mechanism 122, facilitating shift control, and allowing cost reduction and improved operability of the shift lever 36.

The first protrusion 191 and second protrusion 192 are two members protruded from the shift lever 36 in the embodiment, but the present invention is not limited thereto. It is also possible to provide one member at a shift lever and provide two protrusions at the member. Alternatively, it is also possible to provide a first protrusion at a first operating member and provide a second protrusion at a second operating member and to provide a first protrusion engaged member to engage the first protrusion and a second protrusion engaged member to engage the second protrusion at a shift lever. The first protrusion engaged member and second protrusion engaged member may be separate or in a unit.

Obviously, various minor changes and modifications of the present invention are possible in the light of the above teaching. It is therefore to be understood that within the scope of the appended claims the invention may be practiced otherwise than as specifically described.

What is claimed is:

1. A transmission for a working machine, comprising:

a drive transmission mechanism and a working transmission mechanism housed in a transmission case;

a shift lever swingably provided outside the transmission case;

a first operating member for connecting the shift lever to the drive transmission mechanism; and a second operating member for connecting the shift lever to the working transmission mechanism;

the shift lever comprising:

a first protrusion constantly engaging the first operating member; and a second protrusion arranged to engage with the second operating member when the shift lever is swung in one direction and to disengage from the second operating member when the shift lever is swung in the other direction.

* * * * *